United States Patent
Son

(10) Patent No.: US 9,342,185 B2
(45) Date of Patent: May 17, 2016

(54) OPTICAL TOUCH SCREEN

(75) Inventor: Sukwoo Son, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 205 days.

(21) Appl. No.: 13/808,066

(22) PCT Filed: Jul. 12, 2011

(86) PCT No.: PCT/KR2011/005077
§ 371 (c)(1),
(2), (4) Date: Jan. 2, 2013

(87) PCT Pub. No.: WO2012/018177
PCT Pub. Date: Feb. 9, 2012

(65) Prior Publication Data
US 2013/0100085 A1   Apr. 25, 2013

(30) Foreign Application Priority Data
Aug. 2, 2010   (KR) .................... 10-2010-0074589

(51) Int. Cl.
*H04N 1/40* (2006.01)
*G06F 3/042* (2006.01)

(52) U.S. Cl.
CPC .............. *G06F 3/042* (2013.01); *G06F 3/0428* (2013.01)

(58) Field of Classification Search
CPC ................... G06F 3/042; G02B 6/00
USPC ....................................... 345/175
See application file for complete search history.

(56) References Cited

U.S. PATENT DOCUMENTS

| 4,692,809 | A  | * | 9/1987 | Beining et al. ............ 348/712 |
| 7,751,671 | B1 | * | 7/2010 | Newton et al. ............ 385/134 |
| 2005/0200613 | A1 | | 9/2005 | Kobayashi et al. |
| 2006/0232830 | A1 | * | 10/2006 | Kobayashi ............ 358/448 |
| 2008/0143682 | A1 | | 6/2008 | Shim et al. |
| 2009/0213093 | A1 | | 8/2009 | Bridger |
| 2009/0237376 | A1 | | 9/2009 | Bridger |

FOREIGN PATENT DOCUMENTS

| CN | 101206547 A | 6/2008 |
| CN | 101441541 A | 5/2009 |
| CN | 101477273 A | 7/2009 |
| JP | 2001-142643 A | 5/2001 |
| KR | 10-2006-0043857 A | 5/2006 |
| KR | 10-0919437 B1 | 9/2009 |
| KR | 20-0448650 Y1 | 5/2010 |
| TW | 200912200 A | 3/2009 |

\* cited by examiner

*Primary Examiner* — Claire X Pappas
*Assistant Examiner* — Sepideh Ghafari
(74) *Attorney, Agent, or Firm* — Birch, Stewart, Kolasch & Birch, LLP

(57) ABSTRACT

The present invention relates to an optical touch screen, including a flat plate display panel, a case mounted and assembled with the flat plate display panel, brackets assembled on the case, a camera module mounted on the brackets, and an iris formed on the brackets and through which infrared incident on the camera module passes.

15 Claims, 4 Drawing Sheets

[Fig. 3b]

OPTICAL TOUCH SCREEN

TECHNICAL FIELD

The teachings in accordance with the exemplary embodiments of this invention relate generally to optical touch screens.

BACKGROUND ART

A touch screen or touch panel is a display which can detect the location of touches within the display area, usually performed either with the human hand or a stylus. This allows the display to be used as an input device, removing the keyboard and/or the mouse as the primary input device for interacting with the display's content.

Technically speaking, the commonly used touch screens employ resistive, capacitive, ultrasonic wave, electromagnetic, vector force and optical (Infrared) touch modes. Among these types of touch screens, resistive type is the most common one, which has approximately 60% of market share (the second is capacitive type with around 24% of market share). Each of these types of touch screen has its own features, advantages and disadvantages.

Now, these touch screens are briefly explained.

The resistive is a common type of touch screen technology. It is a low-cost solution found in many touch screen applications, including hand-held computers, PDA's, consumer electronics, and point-of-sale-applications. The resistive touch screens are such that a pair of resistive layers facing with each other is provided on a touch screen element. The pressed position is detected by contact between the resistive layers so that one of the resistive layers is formed on a flexible film for deformation during pressing. As mentioned above, the resistive film type is widely used, but disadvantageous due to degraded mechanical and environmental reliability. At the same time, although the resistive touch screen today are widely used on consuming electronic products, it is unable to identify multiple contact points simultaneously on its display area.

The ultrasonic wave touch screen first converts an electric signal into an ultrasonic wave through a transducer, and then directly transmits the ultrasonic wave through a surface of the touch panel. When the touch panel is used, the ultrasonic wave may be absorbed by contacting a pointer to cause attenuation, and an accurate position of the contact is obtained through comparison and calculation between attenuation amounts before and after use. The surface acoustic wave touch screen is disadvantageous due to generation of noise and/or susceptibility to noise.

The electromagnetic type touch screen is such that, in the field of magnetism, a magnetic field is normally generated by a coil due to electromagnetism and said magnetic field induces a voltage in another coil, also called receiver coil, under the premise that the magnetic field strength changes in the receiver coil. It is clear that a non-moving receiver coil is not capable to measure a non-altering magnetic field since no voltage is induced by said magnetic field. There are already means, which can measure a position and/or orientation of a receiver means in relation to a specific magnetic field generating means. To measure the orientation in a 3-dimensional space normally three orthogonal arranged probes are used to calculate the coordinates. These arrangements are most of the time very bulky, space taking and needs a special stylus.

The capacitance type touch screen adopts capacity changes generated from the combination of static electricity between arranged transparent electrodes and a human body, so as to detect coordinates of the contact position through a generated induced current. That is, the capacitance type touch screen includes one substrate having an electrode formed thereon. In the capacitance type touch panel, when, for example, a finger contacts and approaches the touch panel, a variation in capacitance between the electrode and the finger is detected, thereby detecting input coordinates. Since the capacitance type touch panel is a non-contact type, it has high durability, excellent environmental and mechanical reliability due to changeable upper barrier layer unlike the resistive film type touch panel. However, the capacitance type touch panel has disadvantages in that it is difficult to input information with fingers or a pen.

The optical type touch screens principally use no films for touch recognition such that transmittance is 100%. Furthermore, no reflexibility, degradation of brightness and blurring of displays are generated from this optical touch screens. Maintenance of transmittance and brightness in displays is an important factor for image clarity, such that the optical type is adequate for implementation of high quality screens. Furthermore, the optical type touch screens utilize the principle of light source reception and blocking, such that no load is applied to a sensor as detection is not performed by physical or electrical contacts, which increases reliability for use in factory monitoring, various automation equipment and ATM's. The optical type touch screens are advantageously free from such materials as films or ITO (Indium Tin Oxide) protective films to have less susceptibility to scratches or external shocks and a lower error probability including erroneous operation.

DISCLOSURE OF INVENTION

Technical Problem

The present invention is directed to solve an object to enhance a sensitivity of touch recognition.

Technical problems to be solved by the present invention are not restricted to the above-mentioned, and any other technical problems not mentioned so far will be clearly appreciated from the following description by skilled in the art.

Solution to Problem

An object of the invention is to solve at least one or more of the above problems and/or disadvantages in a whole or in part and to provide at least the advantages described hereinafter. In order to achieve at least the above objects, in whole or in part, and in accordance with the purposes of the invention, as embodied and broadly described, and in one general aspect of the present invention, there is provided an optical touch screen, the touch screen characterized by: a flat plate display panel; a case mounted and assembled with the flat plate display panel; brackets assembled on the case; a camera module mounted on the brackets; and an iris formed on the brackets and through which infrared incident on the camera module passes.

Preferably, the bracket includes first and second fixtures fixed on the case, and a connector connected to the first and second fixtures, wherein the iris is connected to the connector.

Preferably, the camera module is connected to the connector.

Preferably, the connector is formed with guides, and the guides are fixed by an infrared filter.

Preferably, the iris is closed by the infrared filter, and the infrared is incident on the camera module through the infrared filter and the iris.

Preferably, the connector is formed with a passage through which the infrared emitted from the camera module passes.

Preferably, the camera module is mounted with an infrared light emitting diode, wherein the infrared emitted from the infrared light emitting diode is emitted to an upper surface of the flat plate display panel through the passage.

Preferably, the passage is mounted with a lens.

Preferably, a light leakage prevention sill is formed at a connection of the bracket between the iris and the lens.

Preferably, the camera module includes an infrared light emitting diode emitting an infrared, an object lens collecting infrared reflected from a retro reflector, an infrared passage filter passing a particular waveband, and a linear sensor detecting an area touched by incidence of infrared having passed the infrared passage filter.

Preferably, the camera module includes a holder formed at one side with a first groove, formed at the other side with a second groove, and formed with an opening connecting the first groove and the second groove, wherein the first groove is mounted with the object lens, the second groove is mounted with the infrared passage filter, and a printed circuit board mounted with the image sensor to close the second groove is attached to the holder.

Preferably, a stair unit is formed at a lateral upper surface of the holder, and the stair unit is mounted with the infrared light emitting diode.

Preferably, the infrared passage filter is implemented by coating an infrared passage filter material on a glass.

Preferably, the case takes the shape of a square ring.

Preferably, the bracket is formed at a corner of the case.

Preferably, three inner corners of the square ring-shaped case are fixed by brackets on which the camera module is mounted, and one inner corner of the square-ring shaped case is mounted with a dummy bracket on which the camera module is not mounted.

Preferably, a retro reflector is mounted on an inner lateral surface of the case among the brackets.

Advantageous Effects of Invention

The optical touch screen according to the present invention has an advantageous effect in that a bracket mounted with a camera module is formed with an iris to dispense with an additional iris structure, whereby manufacturing cost can be reduced. The optical touch screen according to the present invention has another advantageous effect in that a light leakage prevention sill is formed at a connection area between an iris and a lens to prevent infrared emitted from an LED from being directly incident on a sensor through a connection gap between the iris and the lens, whereby touch noise can be reduced to increase a touch sensitivity.

BRIEF DESCRIPTION OF DRAWINGS

The teachings of the present invention can be readily understood by considering the following detailed description in conjunction with the accompanying drawings, in which:

FIGS. 3a and 3b are schematic conceptual views illustrating a linear sensor of an optical touch screen according to the present invention;

BEST MODE FOR CARRYING OUT THE INVENTION

Figure 1:
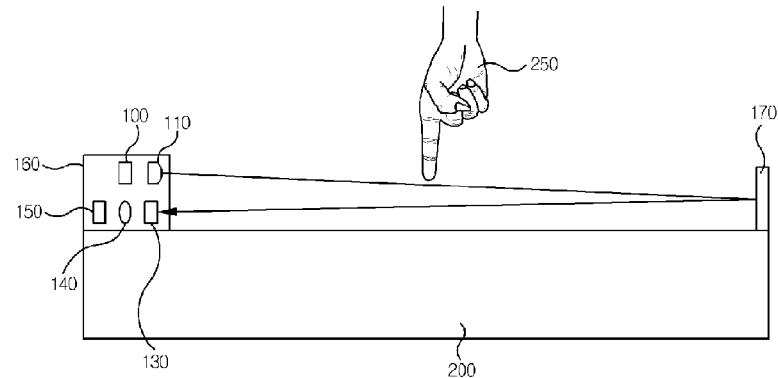
FIG. 1 is a conceptual cross-sectional view illustrating an optical touch screen according to the present invention.

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-10 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

FIG. 1 is a conceptual cross-sectional view illustrating an optical touch screen according to the present invention.

An optical touch screen according to the present invention includes a camera module (160) and a retro reflector (170), all of which are mounted to a front surface of a flat plate display panel (200). The camera module (160) may include an infrared light emitting diode (100) emitting infrared light, an IR (Infrared) pass filter (130) that passes only the infrared reflected from the retro reflector (170), and a linear sensor (150) detecting an area touched by the incident infrared that has passed the IR pass filter (130).

At this time, the optical touch screen may further include an object lens (140) collecting the infrared that has passed the IR pass filter (130). Alternatively, the optical touch screen may be so configured as to allow the light emitted from the infrared light emitting diode (100) to be emitted through a lens (110).

Furthermore, the retro reflector (170) reflects the infrared emitted from the infrared light emitting diode (100), where an incident angle and reflection angle of the infrared are same. Therefore, the infrared light emitting diode (100) of the camera module (160) emits an infrared, where the emitted infrared advances along the flat plate display panel (200) to be reflected from the retro reflector (170) and incident on the IR pass filter (130) of the camera module (160).

At this time, the IR pass filter (130) passes only the infrared that has been reflected from the retro reflector (170), and the infrared that has passed the IR pass filter (130) is incident on the linear sensor (150). In a case a particular area of the flat plate display panel (200) is touched by a finger of a hand (250) while a user views an image displayed on the flat plate display panel (200), the infrared is blocked from the touched area to form a black spot on the linear sensor (150), whereby a coordinate of the touched particular area can be detected.

Furthermore, the flat plate display panel (200) is situated under an area between the infrared light emitting diode (100) and the retro reflector (170), and in a case a user touches a particular area of an image displayed on the flat plate display panel, a driving signal is generated that corresponds to a coordinate detected by the linear sensor (150), whereby various functions including screen change, sound adjustment, screen movement, screen enlargement and screen reduction can be performed. At this time, the flat plate display panel may be one of an LCD (Liquid Crystal Display), an FED (Field Emission Display), a PDP (Plasma Display Panel), an EL (Electroluminescence), an OLED (Organic Light Emitting Diode), and an electronic paper display panel.

Figure 2:
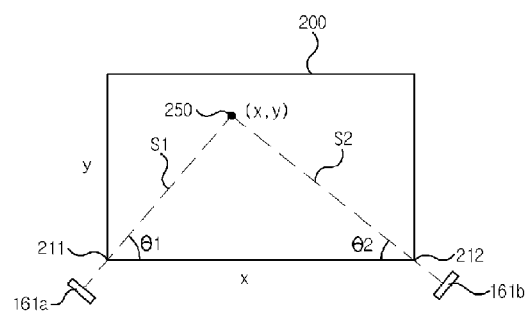
FIG. 2 is a conceptual view illustrating a method for detecting a coordinate of a particular area touched on an optical touch screen according to the present invention.
Figure 3A:
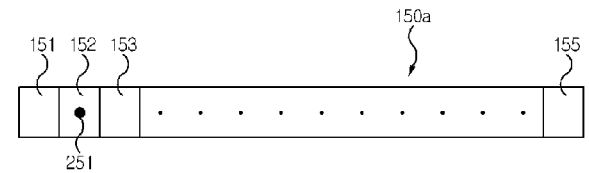
Figure 3A:

FIG. 2 is a conceptual view illustrating a method for detecting a coordinate of a particular area touched on an optical touch screen according to the present invention, and FIGS. 3a and 3b are schematic conceptual views illustrating a linear sensor of an optical touch screen according to the present invention.

The camera module of the optical touch screen may be installed at two or three corner areas of the flat plate display panel (200). For example, as illustrated in FIG. 2, in a case first and second camera modules (161a, 161b) are mounted on two corner areas (211, 212) of the flat plate display panel (200), and a predetermined area (250) of the flat plate display panel (200) is touched, the touched predetermined area (250) is blocked of infrared, and each linear sensor of the first and second camera module (161a, 161b) is formed with a black spot. Therefore, the linear sensor can detect a coordinate of the touched particular area using a position of the black spot.

Each of the linear sensors (150a, 150b) of the first and second camera module (161a, 161b) is mounted with 1st to nth sensing pixel (151, 152, 153, 154, 155) as illustrated in FIGS. 3a and 3b. At this time, in a case the particular predetermined area of the flat plate display panel (200) is touched, one of the 1st to nth sensing pixel (151, 152, 153, 154, 155) is formed with the black spot. Furthermore, because each of the linear sensors (150a, 150b) of the first and second camera module (161a, 161b) is installed at a different position from that of the touched area, there is a high probability that the sensing pixel of the linear sensor (150a) of the first camera module (161a) is differently positioned from the linear sensor (150b) of the second camera module (161b).

For example, as depicted in FIG. 3a, a black spot (251) is formed at the second sensing pixel (152) on the linear sensor (150a) of the first camera module (161a), and as illustrated in FIG. 3b, a black spot (251) is formed at the fourth sensing pixel (154) on the linear sensor (150b) of the second camera module (161b).

Meanwhile, as shown in FIG. 2, if a crosswise direction of the flat plate display panel (200) is defined as x axis, and a lengthwise direction of the flat plate display panel (200) is defined as y axis, a coordinate of the touched area (250) can be extracted, if a connection line (S1) from the touched area (250) to the linear sensor (150a) of the first camera module (161a), a first angle (θ1) formed by a crosswise direction of the flat plate display panel (200), a connection line (S2) from the touched area (250) to the linear sensor (150b) of the second camera module (161b), a second angle (θ2) formed by a crosswise direction of the flat plate display panel (200) and a crosswise length of the flat plate display panel (200) are known.

Furthermore, the first angle (θ1) and the second angle (θ2) are changed according to the position of the touched area (250), and in response thereto, the 1st to the nth sensing pixel (151, 152, 153, 154, 155) of the linear sensors (150a, 150b) are subdivided. That is, each of the 1st to the nth sensing pixel (151, 152, 153, 154, 155) of the linear sensors (150a, 150b) corresponds to the first angle (θ1) and the second angle (θ2).

Therefore, in a case a black spot is formed on one of the sensing pixel of the 1st to the nth sensing pixel (151, 152, 153, 154, 155) of the linear sensors (150a, 150b) on the first and second camera modules (161a, 161b), the first angle (θ1) and the second angle (θ2) can be known, whereby a coordinate (x,y) of the touched area (250) can be extracted.

Furthermore, the optical touch screen may include a coordinate extraction calculator capable of extracting real time a coordinate (x,y) of the touched area (250) touched by the aforementioned method or other methods, in a case a predetermined area (250) of the flat plate display panel (200) is touched.

Figure 4:
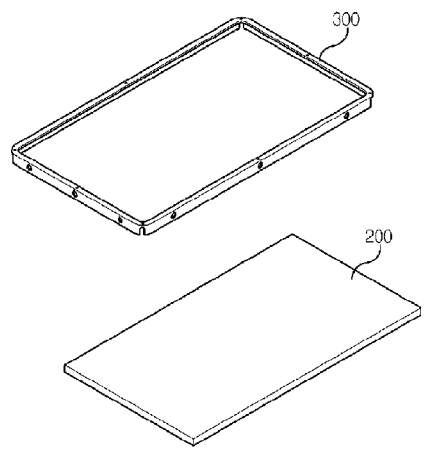
FIG. 4 is a schematic perspective view illustrating a state in which an optical touch screen is fastened according to the present invention.
Figure 5:
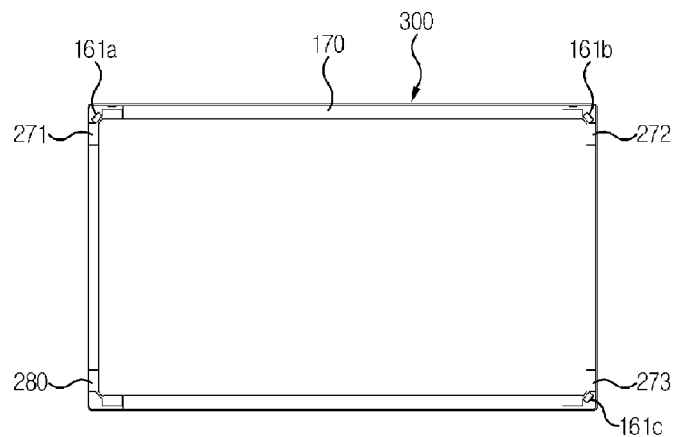
FIG. 5 is a schematic plan illustrating a case of an optical touch screen according to the present invention.

FIG. 4 is a schematic perspective view illustrating a state in which an optical touch screen is fastened according to the present invention, and FIG. 5 is a schematic plan illustrating a case of an optical touch screen according to the present invention.

The optical touch screen according to the present invention may include a case (300) on which the flat plate display panel (200) is mounted, where the case (300) may be called a case top. The case (300) takes the shape of a square ring, and as shown in FIG. 5, an inner lateral surface of the square ring is mounted with the retro reflector (170), and two or three corner areas of the square ring is mounted and assembled with camera modules (161a, 161b, 161c).

At this time, the camera modules (161a, 161b, 161c) are mounted on brackets (271, 272, 273), and each of the brackets (271, 272, 273) is mounted at three square ring corners. Furthermore, a balance one square ring corner is mounted with a dummy bracket (280) that is not mounted with a camera module. That is, the optical touch screen includes the flat plate display panel (200), the square ring-shaped case (300) on which the flat plate display panel (200) is assembled and attached, the brackets assembled on corners of the case (300), and the camera modules (161a, 161b, 161c). At least one of the brackets is a bracket that is not mounted with the camera modules (161a, 161b, 161c). An inner lateral surface of the case (300) in the brackets is mounted with the retro reflector (170). The retro reflector (170) is also mounted on the dummy bracket (280).

FIGS. 6a through 6d are schematic plans illustrating a method of assembling an optical touch screen according to the present invention.

Figure 6A:
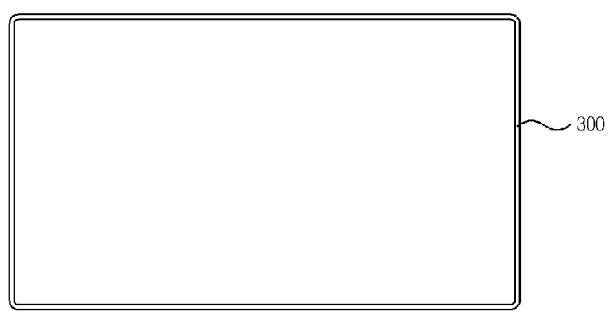
FIGS. 6a through 6d are schematic plans illustrating a method of assembling an optical touch screen according to the present invention.

The method of assembling an optical touch screen according to the present invention is to first prepare the square ring shaped case (300), as illustrated in FIG. 6a.

Figure 6B:
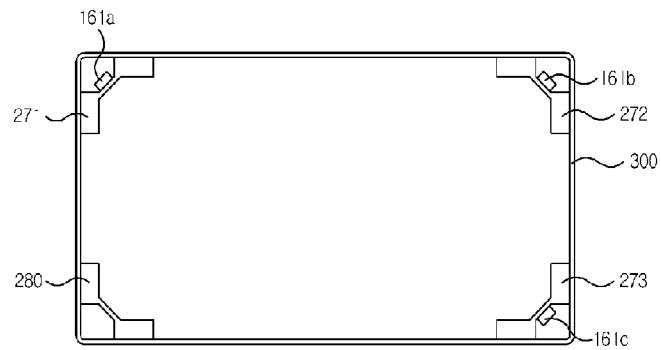

Next, the brackets (271, 272, 273) mounted at three square ring corners of the square ring shaped case (300) are fixed, and the dummy bracket (280) that is not mounted with the camera modules (161a, 161b, 161c) is fixed at one inner lateral corner of the square ring shaped case (300) (FIG. 6b).

In the brackets (271, 272, 273) mounted with the camera modules (161a, 161b, 161c), infrared is emitted from the camera modules (161a, 161b, 161c) and the brackets (271, 272, 273) are formed with openings (not shown) through which the infrared can be incident reflected from the retro reflector (170). The dummy bracket (280) is not formed with an opening which is not needed.

Figure 6C:
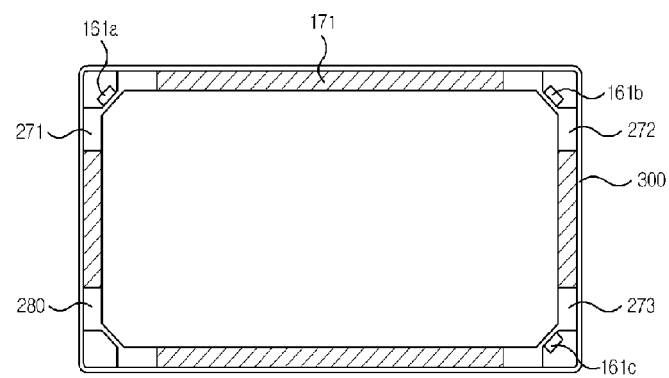
Figure 6D:
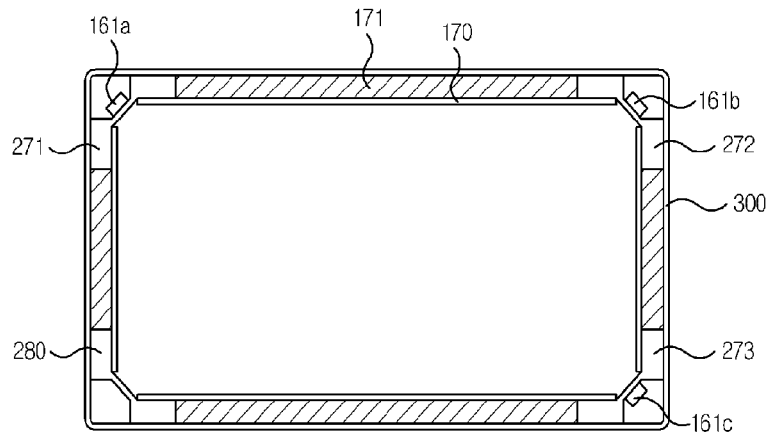

Successively, an inner lateral surface of the case in the brackets (271, 272, 273, 280) is mounted with a frame (171) for fixing the retro reflector (170) (FIG. 6c). Referring to FIG. 6c, the brackets (271, 272, 273, 280) means the brackets (271, 272, 273) that are mounted with camera modules (161a, 161b, 161c) and the dummy bracket (280) that is not mounted with camera module.

Thereafter, the retro reflector (170) is fixed at the frame (171) and the dummy bracket (280) (FIG. 6d), where the retro reflector (170) can be fixed without blocking each opening of the brackets (271, 272, 273) mounted with camera modules (161a, 161b, 161c). Following the assembly process of FIG. 6d, the flat plate display panel (200) is mounted on the case (300).

Figure 7:
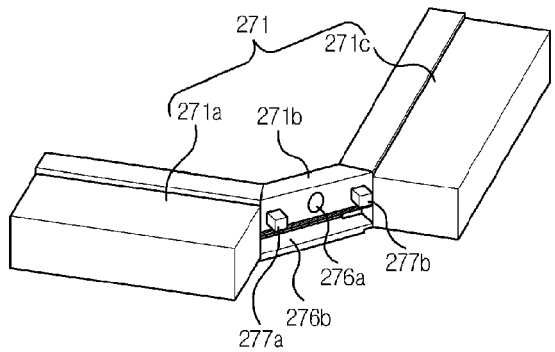
FIG. 7 is a schematic partial perspective view illustrating a bracket on which a camera module is mounted according to the present invention.

FIG. 7 is a schematic partial perspective view illustrating a bracket on which a camera module is mounted according to the present invention.

The bracket (271) mounted with the camera module includes first and second fixtures (271a, 271c) that are fixed to the case, and a connection (271b) connected to the first and second fixtures (271a, 271c), where the camera module is mounted to the connection (271b) of the bracket (271), and the connection (271b) of the bracket (271) includes an iris (276a) for adjusting the amount of infrared incident on the camera module, and a passage (276b) through which the infrared emitted from the camera module can pass.

The position where the iris (276a) and passage (276b) are formed at the connection (271b) of the bracket (271) is not limited to positions shown in FIGS. 7 to 10, and may be implemented in various ways. Furthermore, the bracket (271) mounted with the camera module is mounted at the corner of the case.

Therefore, infrared emitted from the camera module is discharged through the passage of the bracket (271), reflected by the retro reflector mounted at the case, and incident on the camera module through the iris (276a) of the bracket (271), whereby the touch can be detected. At this time, the incident amount of infrared can be adjusted by size of the iris (276a). For example, a larger amount of incident infrared can be inputted if the iris (276a) is large, and a smaller amount of incident infrared can be inputted if the iris (276a) is small.

That is, the optical touch screen according to the present invention includes a flat plate display panel, a case mounted and assembled with the flat plate display panel, a bracket assembled to the case, a camera module mounted on the bracket, and an iris formed at the bracket and through which the infrared incident on the camera module passes. Therefore, the optical touch screen according to the present invention is advantageous in that an iris is formed at the bracket mounted with a camera module to reduce the manufacturing cost by dispensing with configuration of additional iris structure.

Figure 8:
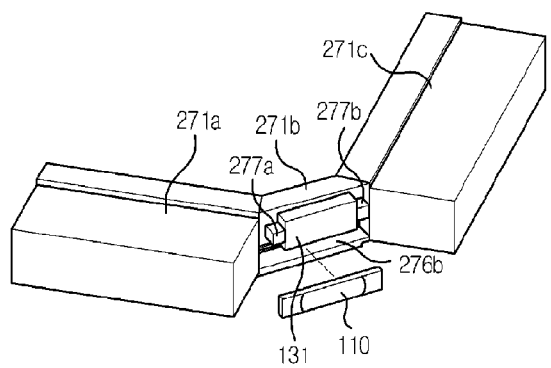
FIG. 8 is a schematic partial perspective view illustrating a camera module-mounted bracket mounted with an infrared filter and a lens
Figure 9:
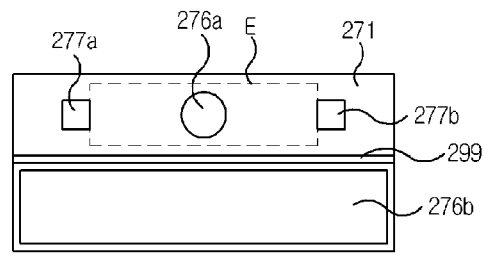
FIG. 9 is a schematic partial perspective view illustrating a connection of a bracket mounted with a camera module according to the present invention.

FIG. 8 is a schematic partial perspective view illustrating a camera module-mounted bracket mounted with an infrared filter and a lens according to the present invention, and FIG. 9 is a schematic partial perspective view illustrating a connection of a bracket mounted with a camera module according to the present invention.

As apparent from the foregoing, areas of both lateral surfaces of the iris (276a) at the connection (271b) of the bracket (271) are formed with guides (277a, 277b), as shown in FIG. 9. An inner lateral area (E) of the guides (277a, 277b) is mounted with an IR (infrared) filter (131) which is in turn fixed by the guides (277a, 277b). The iris (276a) is closed by the IR filter (131).

Furthermore, the IR filter (131) may pass only the infrared from the incident light, and/or may pass only a particular waveband from the infrared. Therefore, the guides (277a, 277b) are mounted therein with the IR filter (130) as depicted in FIG. 8, and the infrared through the IR filter (131) passes the iris (276a). The connection (271b) of the bracket (271) is formed with a passage (276b) through which the infrared from the camera module pass, where the passage (276b) is mounted with a lens (110).

That is, the camera module is mounted with an IR diode, and the infrared emitted from the IR diode is discharged to an upper surface of the flat plate display panel through the lens (110).

Furthermore, as illustrated in FIG. 9, the optical touch screen according to the present invention is such that a light leakage prevention sill is formed at a connection (271b) area of the bracket (271) between the iris and the lens, whereby the infrared emitted from the lens (110) can be fundamentally prevented from entering the iris (276a), whereby touch noise can be advantageously reduced to improve the touch sensitivity.

MODE FOR THE INVENTION

Figure 10:
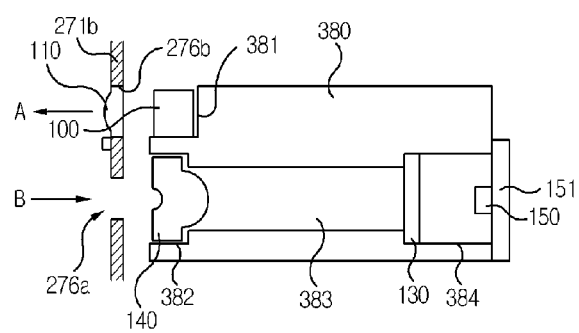
FIG. 10 is a schematic partial perspective view illustrating a bracket mounted with a camera module and the camera module according to the present invention.

FIG. 10 is a schematic partial perspective view illustrating a bracket mounted with a camera module and the camera module according to the present invention.

First of all, the camera module according to the present invention includes an infrared light emitting diode (100) emitting an infrared (A), an object lens (140) collecting infrared (B) reflected from a retro reflector, an infrared passage filter (131) passing a particular waveband out of infrared (B) collected at the object lens (140), and a linear sensor (150) detecting an area touched by incidence of infrared having passed the infrared passage filter (131).

At this time, the camera module is mounted at the connection (271b) of the bracket, such that the infrared light emitting diode (100) corresponds to the lens (110) mounted at the passage (276b) of the connection (271b), and the object lens (140) corresponds to the iris (276a) formed at the connection (271b).

Therefore, the infrared (A) emitted from the infrared light emitting diode (100) is discharged to an upper surface of the flat plate display panel through the lens (110), and infrared (B) reflected from the retro reflector is incident on the linear sensor (150) through the iris (276a), the object lens (140) and the infrared passage filter (131). The size of the iris (276a) determines the amount of infrared (B) incident from the linear sensor (150) after the infrared is reflected from the retro reflector.

Meanwhile, as illustrated in FIG. 10, an exemplary structure of a camera module includes a holder (380) formed at one side with a first groove (382), formed at the other side with a second groove (384), and formed with an opening (383) connecting the first groove (382) and the second groove, (384) wherein the first groove (382) is mounted with the object lens (140), the second groove (384) is mounted with the infrared passage filter (130), and a printed circuit board (151) mounted with the image sensor (150) to close the second groove (384) is attached to the holder (380), where a stair unit (381) is formed at a lateral upper surface of the holder (380), and the stair unit (381) is mounted with the infrared light emitting diode (100), and the infrared passage filter (131) is implemented by coating an infrared passage filter material on a glass. The glass functions as a cover plated for protecting the image sensor.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to be limited to the examples and designs described herein but is to be accorded the widest scope consistent with the principles and novel features disclosed herein.

INDUSTRIAL APPLICABILITY

The present invention has an industrial applicability in that a bracket mounted with a camera module is formed with an iris to dispense with an additional iris structure, whereby manufacturing cost can be reduced, and a light leakage prevention sill is formed at a connection area between an iris and a lens to prevent infrared emitted from an LED from being directly incident on a sensor through a connection gap between the iris and the lens, whereby touch noise can be reduced to increase a touch sensitivity.

The invention claimed is:

1. An optical touch screen, comprising:
a flat plate display panel;
a case mounted with the flat plate display panel;
a bracket assembled on the case;
an infrared light emitting diode disposed on a holder at an outer side of the bracket and emitting infrared light to an inner side of the bracket, wherein a stair unit is formed at a lateral upper surface of the holder, and the stair unit is mounted with the infrared light emitting diode;
a passage formed on the bracket and through which infrared light emitted from the infrared light emitting diode passes;
a retro reflector disposed at an inner side of the bracket and configured to reflect infrared light passing through the passage;
an iris formed on the bracket and through which infrared light reflected from the retro reflector passes; and
a sensor disposed at the outer side of the bracket and detecting infrared light passing through the iris.

2. The optical touch screen of claim 1, wherein the bracket includes first and second fixing parts fixed on the case, and a connecting part connected to the first and second fixing parts, and
wherein the passage and the iris are formed on the connecting part.

3. The optical touch screen of claim 2, wherein the connecting part is formed with guides, and the guides are fixed by an infrared filter.

4. The optical touch screen of claim 3, wherein the iris is closed by the infrared filter, and the infrared light is incident to the sensor through the infrared filter and the iris.

5. The optical touch screen of claim 1, wherein infrared light emitted from the infrared light emitting diode is emitted to an upper surface of the flat plate display panel through the passage.

6. The optical touch screen of claim 1, wherein the passage is mounted with a lens.

7. The optical touch screen of claim 6, wherein a light leakage prevention sill is formed at a connection of the bracket between the iris and the lens.

8. The optical touch screen of claim 1, further comprising:
an object lens collecting infrared light reflected from the retro reflector; and
an infrared passage filter passing a particular waveband,
wherein the sensor detects an area touched by incidence of infrared light having passed the infrared passage filter.

9. The optical touch screen of claim 8, wherein the holder is formed at one side with a first groove, formed at the other side with a second groove, and formed with an opening connecting the first groove and the second groove, and
wherein the first groove is mounted with the object lens, the second groove is mounted with the infrared passage filter, and a printed circuit board mounted with the image sensor to close the second grove is attached to the holder.

10. The optical touch screen of claim 9, wherein the infrared passage filter is implemented by coating an infrared passage filter material on a glass.

11. The optical touch screen of claim 1, wherein the case takes the shape of a square ring.

12. The optical touch screen of claim 11, wherein the bracket is disposed at a corner of the case.

13. The optical touch screen of claim 11, wherein three inner corners of the square ring-shaped case are fixed by brackets on which the infrared light emitting diode is mounted, and one inner corner of the square-ring shaped case is mounted with a dummy bracket on which the infrared light emitting diode is not mounted.

14. The optical touch screen of claim 13, wherein the retro reflector is mounted on an inner lateral surface of the case.

15. The optical touch screen of claim 1, wherein the bracket includes first and second fixing parts fixed on the case, and a connecting part connected to the first and second fixing parts, wherein the iris is formed at the connecting part.

* * * * *